United States Patent [19]

Heimala et al.

[11] 4,002,544
[45] Jan. 11, 1977

[54] HYDROMETALLURGICAL PROCESS FOR THE RECOVERY OF VALUABLE COMPONENTS FROM THE ANODE SLIME PRODUCED IN THE ELECTROLYTICAL REFINING OF COPPER

[75] Inventors: Seppo Olavi Heimala; Olli Viljo Juhani Hyvarinen; Jorma Pentti Eenokki Kinnunen, all of Pori; Heikki Aukusti Tiitinen, Ulvila, all of Finland

[73] Assignee: Outokumpu Oy, Helsinki, Finland

[22] Filed: Oct. 1, 1975

[21] Appl. No.: 618,510

[30] Foreign Application Priority Data
Apr. 3, 1975  Finland .............................. 991/75

[52] U.S. Cl. ........................... 204/109; 204/105 R; 75/99; 75/118 R; 75/121
[51] Int. Cl.[2] ...................... C25C 1/20; C25C 1/22
[58] Field of Search ..................... 75/99, 118, 121; 204/105 R, 109

[56] References Cited

UNITED STATES PATENTS

| 509,634 | 11/1893 | Tuttle et al. | 75/99 |
| 2,031,299 | 2/1936 | Betterton et al. | 75/99 |

*Primary Examiner*—R. L. Andrews
*Attorney, Agent, or Firm*—Brooks Haidt Haffner & Delahunty

[57] ABSTRACT

A hydrometallurgical process for the recovery of silver, selenium and tellurium from the anode slime produced in the electrolytic refining of copper or lead or from other raw materials bearing these metals, wherein the raw material and concentrated sulfuric acid or oleum are heated at approx. 160°–300° C, preferably 160°–200° C, in order to sulfate the nickel and the possible copper. The concentrated sulfuric acid in which the silver, selenium, barium, and tellurium present in the raw material have dissolved is separated from the undissolved solid material so that the sulfuric acid can be treated separately for the recovery of Ag, Se, and Te and the solid material separately for the recovery of valuable components present in it.

5 Claims, 3 Drawing Figures

HYDROMETALLURGICAL PROCESS FOR THE RECOVERY OF VALUABLE COMPONENTS FROM THE ANODE SLIME PRODUCED IN THE ELECTROLYTICAL REFINING OF COPPER

BACKGROUND OF THE INVENTION

The present invention relates to a hydrometallurgical process for the recovery of valuable components, especially gold, silver and platinum, as well as selenium, tellurium, copper, nickel, etc., from the anode slime produced in the copper electrolysis, copper having preferably been removed from the slime in advance. The anode slimes produced in the electrolytic refining of lead, etc., as well as scraps or metallurgical intermediates bearing the above components, can also be treated according to the invention in order to separate silver from them. For the sake of clarity, only the treatment of anode slime from the copper electrolysis is discussed below. The anode slime produced in the refining of copper by electrolysis contains that part of the anode which is insoluble in electrolysis and cntains varying quantities of copper, nickel, silver, gold, selenium, tellurium, arsenic, sulfur, lead, silicates, etc., depending on the anode. The main object in treating anode slimes has been to separate the valuable metals, but the separation of byproducts such as selenium and tellurium is usually also profitable.

Owing to the facts that the number of components concerned is great and that in different refineries the compositions of the slime and the local conditions vary greatly, a very great number of different processes are used for the treatment of anode slimes. Some characteristics common to them can be distinguished, however, as is proven in the discussion below.

In the treatment of anode slime, copper and nickel are usually removed first and selenium and tellurium thereafter. Dore metal, which is a silver-gold mixture bearing small quantities of copper and the platinum and palladium present in the slime, is obtained by smelting from the slime purified of the above components. The dore metal is refined by electrolysis, whereby pure silver is deposited on the cathode. Anodes for the electrolytic refining of gold are cast from the anode slime produced in the silver electrolysis; in the gold electrolysis, pure gold is obtained on the cathode and the Pt and Pd dissolved in the electrolyte can be separated from it.

Copper is usually removed by slurrying the slime collected from the copper electrolysis tanks in dilute sulfuric acid, e.g., the cycled solution of the copper electrolysis, and by blowing air through the slurry, whereby the metallic copper dissolves as a sulfate. Some other methods for removing the copper are the oxidizing and the sulfating roasting, whereby copper is obtained in a form soluble in mild acid or water.

If considerable quantities of nickel (10–50%) are present in the anode slime, the nickel can be removed by sulfuric acid roasting within the temperature range 180°–300° C after the separation of copper. The nickel, which is present in the slime as an oxide, converts into a sulfate and is dissolved in water.

The most important methods for recovering selenium are:

1. Sulfating roasting. A slime devoid of Cu and Ni is mixed with sulfuric acid and roasted at a high temperature (500°–600° C), whereby $SeO_2$ evaporates. The $SeO_2$ is recovered from the discharge gases into mild sulfuric acid. Raw selenium is produced from this solution by reducing it by means of $SO_2$.

2. Soda roasting. A mixture of anode slime and soda is roasted at a temperature of 350°–450° C and simultaneously blasted with air. Se and Te oxidize into $Na_2SeO_3$, $Na_2SeO_4$ and $Na_2TeO_3$. These are dissolved in water, from which they can be separated by different methods.

3. Soda smelting. A slime devoid of Cu and Ni is smelted together with soda. Air is blasted into the molten batch and it oxidizes and evaporates part of the Se and Te, which are recovered in the wash of the gases. The slag bearing Se and Te is leached in sulfuric acid or the acid wash solution of the gases. When the solution is neutralized (pH = 5–6), $TeO_2$ precipitates and the selenium is reduced into elemental form by means of $SO_2$.

The recovery of tellurium is always based on bringing it into a water soluble state and precipitating it as $TeO_2$, from which elemental Te can be produced by electrolysis, for example. Te can be caused to dissolve from anode slime either in connection with soda roasting or soda smelting or by boiling the slime together with a base after an oxidizing or a sulfating roasting.

In principle the object in refining anode slime is that the various components to be recovered are completely separated, in a pure form, each at its own stage, before the dore smelting, which is usually the most expensive and complicated stage of the process. The first stage in a dore furnace is the oxidation of lead, nickel and copper by means of air and the compounding of the same with silicate slag. When the slag is removed and the oxidation is continued, the As and Sb are evaporated as oxides. Se and Te are separated by means of soda slag and a niter oxidizer. The metal is cast into anodes for the Ag refining electrolysis.

SUMMARY OF THE INVENTION

Surprisingly it has now been observed that the actual dore smelting can be eliminated in the refining of anode slime. This observation is based on the realization that when anode slime is sulfated, i.e., when a mixture of sulfuric acid and anode slime is heated at 160°–300° C, the Ag, Se, and Te, Ba are dissolved in the sulfuric acid, while Ni and Cu are sulfated, but the solubility of their sulfates in sulfuric acid is so low that when the sulfuric acid and the solid material are separated by filtration after the sulfating, the following distribution is obtained: sulfuric acid, in which more than 95% of the silver, selenium and tellurium present in the anode slime have dissolved, and a solid phase which contains the insoluble part of the anode slime, the main components $PbSO_4$ and $SiO_2$ and the solid Ni and Co sulfates. Ni and Cu can be easily separated from the insoluble part by leaching them in water.

In addition it was observed that hot, fuming, concentrated sulfuric acid as well as oleum can be separated from the undissolved material by filtration. Although such an operation is not performed in any generally known process, it has been proven in the experiments now performed that this can be performed relatively easily also in technical scale. The filtration was most successful with the aid of polytetrafluoroethylene filter cloth, but also other materials can be considered. The dissolved components can be separated from sulfuric acid received by filtration and which is free from solid materials, e.g. by cooling, electrolysis, gradual dilution and precipitation of the dissolved material from the sulfuric acid.

The Ag, Se and Te can be separated electrolytically by using insoluble anodes from the sulfuric acid filtrate after the sulfating. A powder, the composition of which depends on the proportions of the components dissolved in the sulfuric acid, deposits on the cathode. If silver is present in the solution in a quantity considerably greater than the quantities of selenium and tellurium, metallic silver deposits on the cathode and the selenium deposits on the cathode together with silver as $Ag_2Se$ and the tellurium deposits on the cathode together with silver as $Ag_2Te$. If there is an excess of Se and Te in proportion to silver, they deposit on the cathode in an elemental form and the silver present in the solution precipitates as Se and Te compounds.

The cathode potential must be observed during the electrolysis and the current of the electrolysis must be regulated accordingly. If the cathode potential is more positive than O mV, preferably, however, more positive than + 100 mV in relation to a saturated calomel electrode (SCE), the components dissolved in the sulfuric acid, such as Pb, Ni, Cu, As, and Sb, do not deposit on the cathode. In addition, if the cathode is strongly polarized, it is possible that hydrogen selenide or hydrogen telluride begins to discharge on the cathode.

If the electrolysis is operated in batches, i.e., a certain quantity of solution is taken into the electrolytic cell and the electrolysis is terminated when the Ag, Se and Te concentrations have lowered to the desired value owing to deposition as indicated above the maximum current can be conducted into the cell at the beginning of the electrolysis, but when the concentration of these components in the solution diminishes greatly, the electrode potential of the cathode tends to change in the negative direction, at which time the deposition together of the said impurities is possible. To prevent this, the electrolytic current must be reduced during the electrolysis.

It is possible to precipitate Ag, Se and Te from sulfuric acid so that their concentrations are less than 1 g/l. The electrolyzed acid can be returned to the sulfating to be recycled.

The powder precipitating on the cathode deposits on the bottom of the cell, from where it can be collected and separated from the sulfuric acid by filtration. The Se and Te present in the cathode deposit can be separated from the silver by smelting this material under oxidizing conditions, whereby the evaporating $SeO_2$ and $TeO_2$ can be recovered from the discharge gases or, when soda is used as the slagging agent, they combine with the slag. In this manner the selenium and tellurium are separated from the silver simply by smelting, and the slagging of lead etc. necessary in dore smelting is eliminated. The quantity of material to be smelted and the number of operation stages are in this case smaller than in dore smelting. On the other hand, in any case silver must be smelted and cast into anodes for electrolytic refining, and the separation of Se and Te can be linked to this smelting stage. Se and Te can be passed into the aqueous solution either in the wash of the discharge gases from the smelting or by dissolving the soda slag in water and by separating Se and Te from this aqueous solution by some known technique, e.g., by first precipitating $TeO_2$ and then reducing selenium by means of $SO_2$.

By the sulphating of anode slime, Ag, Te and Se were caused to dissolve in sulfuric acid. When small quantities of water, 2–10% by vol., were added to this concentrated sulfuric acid after filtration, it was observed that a deposit containing approx. 90% of the dissolved selenium precipitated from the sulfuric acid. In addition, the quantity of silver present in the deposit was approximately equal to that of selenium, in percentages by weight. This method makes it possible to precipitate most of the selenium from the sulfuric acid, as well as to separate the precipitate by filtration and to treat it for the recovery of the selenium. This is easiest by heating the deposited material at 500–600° C, whereby the $SeO_2$ evaporates and can be recovered as in the Se roasting processes commonly used. The solid residue, the main component of which is silver sulfate, can be, for example, returned to the sulfating.

Thus, there are two possibilities for the recovery of selenium: either by precipitation from the sulfuric acid and by roasting the deposit thereby obtained or by electrolytic deposition and by smelting the deposit thereby obtained.

The dissolving of gold, platinum, and palladium in the sulfating process depends on the temperature. If the sulfating is performed at below 200° C, the dissolving of these elements is insignificant. By raising the temperature the dissolving of Au and Pd is improved, but the complete dissolving of Pt is very difficult even at 300° C. When these elements have dissolved in sulfuric acid, they precipitate electrolytically along with Ag, Se, and Te. In practice, however, it is more advantageous to perform the sulfating at below 200° C, whereby Au, Pt, and Pd remain undissolved, and to treat the undissolved cementate, from which the water soluble sulfates of Ni and Cu have been washed off, separately in order to recover the Au, Pt, and Pd.

One advantage of the present invention is that, by using a low sulfating temperature, the Au, Pt, and Pd can be separated from the silver, which facilitates the electrolytic refining of silver.

DESCRIPTION OF THE PREFERRED EMBODIMENTS

Figure 1:
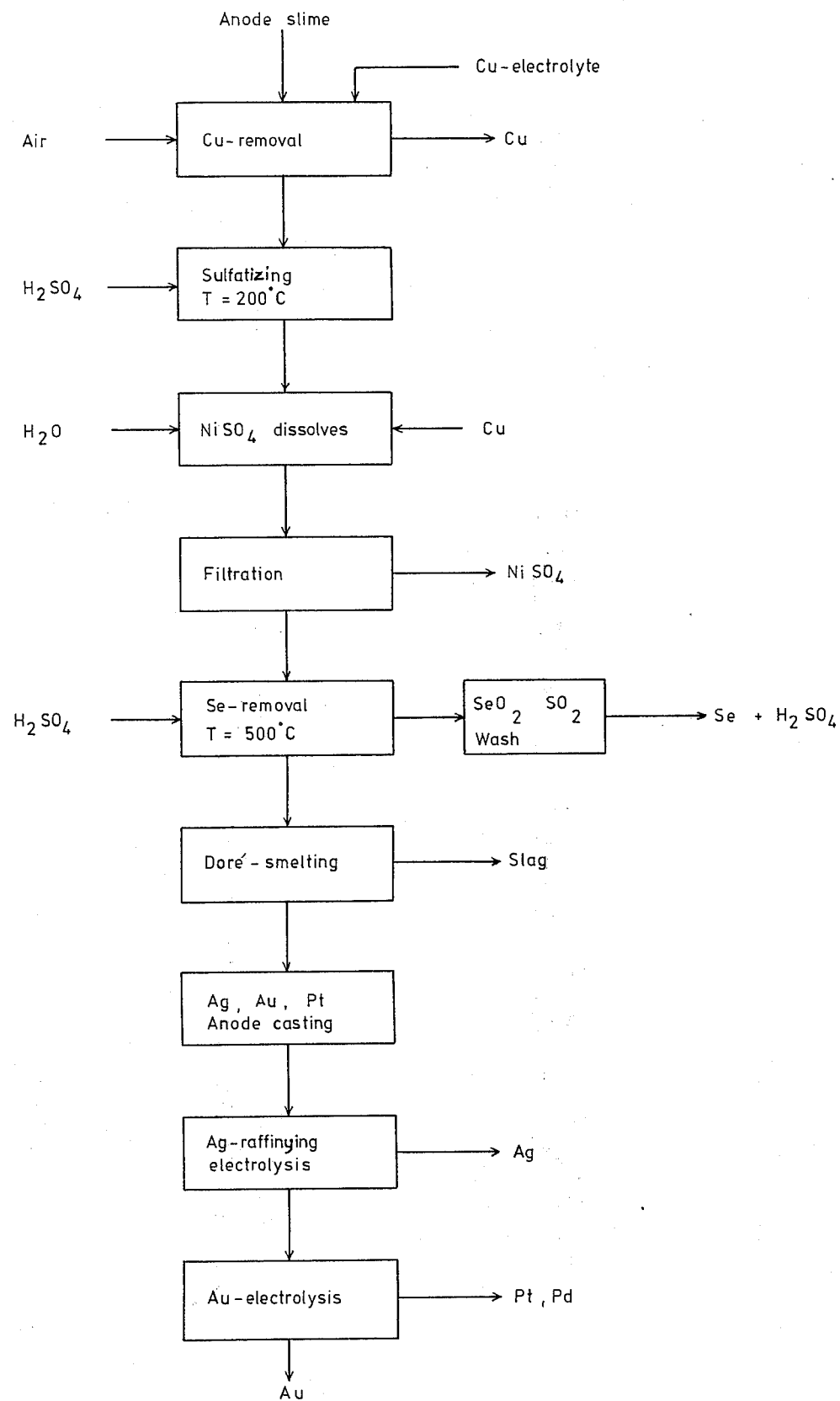
FIG. 1 is the flow diagram of a process known per se and used until now.

It can be observed from the flow diagram of FIG. 1 that the Cu, Ni, and Se are separated from the anode slime, each selectively at a separate stage, but the separation of silver and gold, as well as platinoids, in practice requires the complicated dore smelting.

Figure 2:
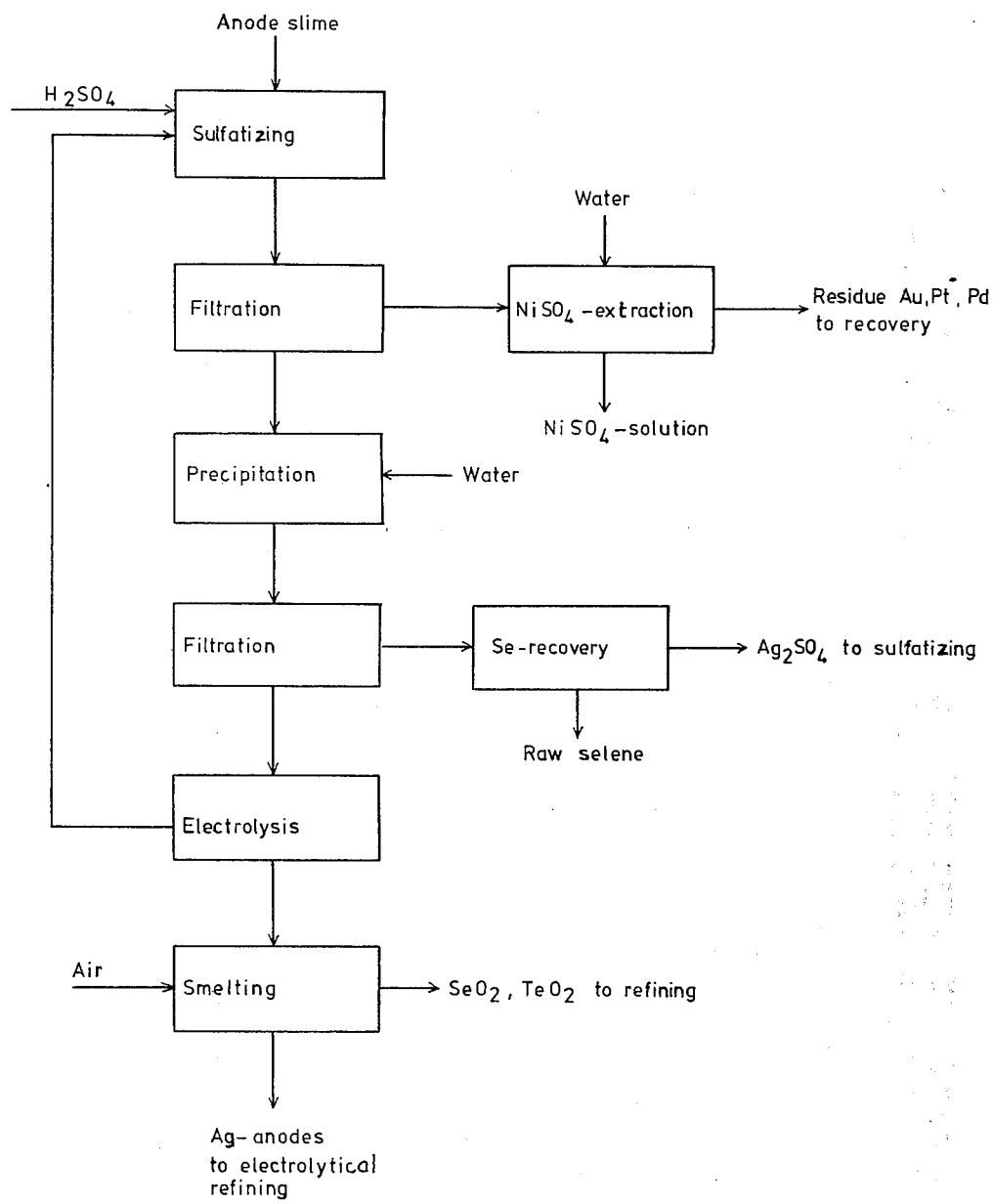
FIG. 2 illustrates the preferred embodiment of the present invention.

FIG. 2 is a flow diagram which illustrates the process according to the invention. Anode slime or any raw material, such as silver scrap, containing valuable metals is fed to the sulfating together with sulfuric acid. When the sulfating is performed at a sufficiently low temperature, below 200° C, the Ag, Se, and Te dissolve, but the Au, Pt, and Pd remain undissolved and can be separated from the filtered solid residue after the water soluble sulfates, such as Ni and Cu sulfates, have first been dissolved in water from this residue.

Se can be deposited by means of water from the sulfuric acid filtrate obtained by the filtration following the sulfating. The deposit thereby produced can be separated by filtration, the Se can be removed from it, and the silverbearing residue can be returned to the sulfating. The Se poor sulfuric acid or directly the sulfuric acid from which Se has not been deposited, is fed to the electrolysis, wherein Ag, Se, and Te deposit on the cathode. When the concentration of these components has lowered sufficiently, the acid is returned to the sulfating.

The material deposited on the cathode as well as that deposited on the bottom of the electrolytic tank is collected and smelted. When air or oxygen is blown into the melt, the Se and Te oxidize into their oxides and evaporate. The discharge gases from the smelting can be treated by conventional methods for the separation of Se and Te. The molten silver is cast into anodes for electrolytic refining.

Figure 3:
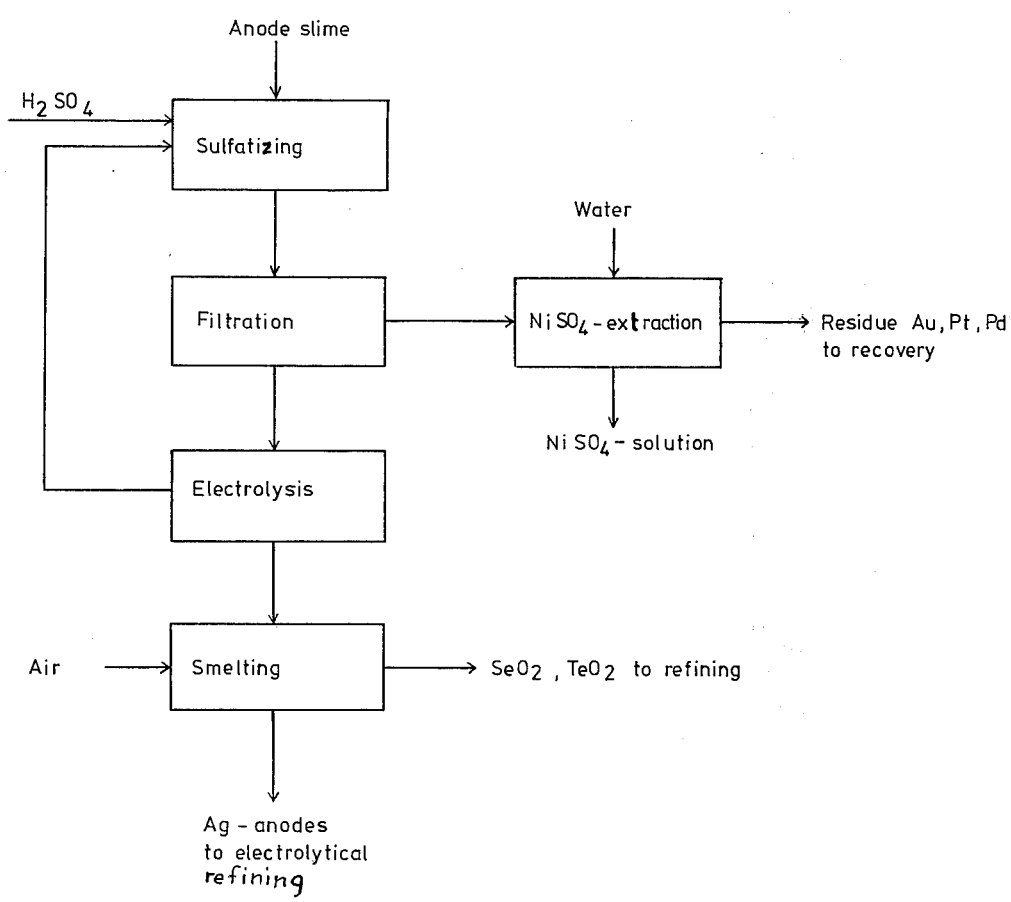
FIG. 3 illustrates an alternative embodiment of the process according to the invention.

In the alternative embodiment illustrated in FIG. 3, the deposition of selenium by means of water has been eliminated, in which case the selenium is completely deposited at the electrolytic stage and separated as selenium oxide from the silver along with the tellurium during the oxidizing roasting; the selenium is recovered from the selenium oxide by a method known per se. It can be observed that the number of stages has decreased sharply in comparison with the process according to FIG. 1, and in addition, the expensive and complicated dore smelting has been entirely eliminated.

In the cases illustrated in FIGS. 2 and 3, copper can also be removed from the anode slime before the sulfating.

Examples are presented below of the purification of anode slime by the process according to the invention.

EXAMPLE 1

Dried copper electrolysis anode slime from which Cu had been removed by dissolving, using air as an oxidizer, was sulfated in an iron tank containing 4 kg of slime and 10 l of 98-percent sulfuric acid. The temperature was 180° C and the sulfating period 4 h. The tank had propeller stirring.

The batch was filtered while hot by means of a grading filter, using a polytetrafluoroethylene cloth as the filtering cloth.

The material remaining in the filter was slurried in 80° C hot water, whereby the $NiSO_4$ dissolved, and then filtered. The insoluble slime thereby obtained was dried and weighed. Its weight was 1.1 kg. The analyses of the initial slime and the sulfated and water-washed slime were as follows:

|  | % Ag | Se | Te | Ni | Au | Pb |
|---|---|---|---|---|---|---|
| Initial slime | 11.0 | 4.9 | 0.89 | 43 | 0.26 | 6.5 |
| Sulfated and washed slime | 0.95 | 0.7 | 0.16 | 1.1 | 0.86 | 24 |

From the slime, 97.6 % of the silver, 96 % of the selenium and 95 % of the tellurium had thus dissolved. Only 10 % of the gold had dissolved.

The nickel sulfate solution obtained from the deposition of the sulfated slime contained Ni 77 g/l, Ag 0.02 g/l, and Se 0.08 g/l.

According to the analysis the sulfuric acid filtrate, the volume of which was 7 l, contained Ag 55.4 g/l, Se 24.9 g/l, Te 5.2 g/l, Ni 1.3 g/l, Pb 0.9 g/l, and Au 120 mg/l.

The sulfuric acid filtrate was placed in an iron tank in which there were titanium-plate cathodes and lead-plate anodes which had been enclosed in ceramic boxes serving as diaphragms. The anolyte was a 20-percent sulfuric acid solution. The cathode space had propeller stirring, and the temperature of the electrolysis was 70° C. At the beginning of the electrolysis the density of the current was 300 A/m² and the cathode potential was + 150 mV in relation to the saturated calomel electrode (SCE). When the catholyte was spent during the electrolysis, the cathode potential began to diminish. At that time the electrolytic current was decreased so that the cathode potential was always < 100 mV (SEC). The electrolysis was terminated when the density of the current was 50 A/m², at which time the silver concentration in the solution was 1 g/l and the Se and Te concentration 0.2 g/l. The acid was reused for the sulfating. 654 g of a pulverous material had deposited on the cathodes, and 420 Ah had been used for this deposition. The analysis of the cathode deposit was 63.5 % Ag, 27.4 % Se, and 5.1 % Te, and Pb, Ni, and Cu > 0.1 %.

EXAMPLE 2

Water at a rate of 5 % by vol. was added to the sulfuric acid filtrate which had been obtained from the sulfating of the anode slime and which contained Ag 39.5 g/l, Se 20.7 g/l, and Te 2.5 g/l. The solution was allowed to stand at room temperature for 20 h and filtrated thereafter. The sulfuric acid filtrate contained Ag 26 g/l, Se 1.7 g/l, and Te 2.2 g/l. The filtered deposit contained Se 29 %, and Ag 19 %. This deposit was heated to 550° C, whereby the Se evaporated and the residue contained Ag 49 % and Se < 0.2 %. When the sulfuric acid filtrate was electrolyzed under the conditions of the previous example, a powder with the composition Ag 88.9 %, Se 3.4 %, and Te 7.0 % was obtained on the cathode. The consumption of current was 490 Ah/kg.

What is claimed is:
1. A hydrometallurgical process for the recovery of silver, selenium and tellurium from anode slime from copper or lead bearing raw materials, in which the raw material and concentrated sulfuric acid or oleum are heated at approximately 160°–300° C, to dissolve Ag, Se, Te and Ba, comprising separating the concentrated sulfuric acid containing the silver, selenium, barium and tellurium dissolved from the raw material and treating said sulfuric acid separately for recovering Ag, Se, and Te.

2. The process of claim 1, in which Ag, Se, and Te are separated as a deposit from the sulfuric acid by electrolysis and the purified sulfuric acid is returned to the sulfating of the raw material.

3. The process of claim 2, wherein, before electrolytic deposition from the sulfuric acid there is added water in a quantity of 2-50% by volume, the solution is filtered, the filtrate is treated by the process according to claim 2 and the deposit is treated for the recovery of the selenium and silver.

4. The process of claim 3, wherein the quantity of water added is about 2-10% by volume.

5. The process of claim 1 wherein said heating is carried out at 160°–200° C.

* * * * *

UNITED STATES PATENT AND TRADEMARK OFFICE
CERTIFICATE OF CORRECTION

PATENT NO. : 4,002,544
DATED : January 11, 1977
INVENTOR(S) : Seppo Olavi Heimala et al It is certified that error appears in the above-identified patent and that said Letters Patent are hereby corrected as shown below:

Col. 1, line 22

"cntains" should be --contains--

Col. 6, line 15

"mV (SEC)." should be --mV (SCE).--

Signed and Sealed this

Tenth Day of May 1977

[SEAL]

Attest:

RUTH C. MASON
Attesting Officer

C. MARSHALL DANN
Commissioner of Patents and Trademarks